Figure 1:
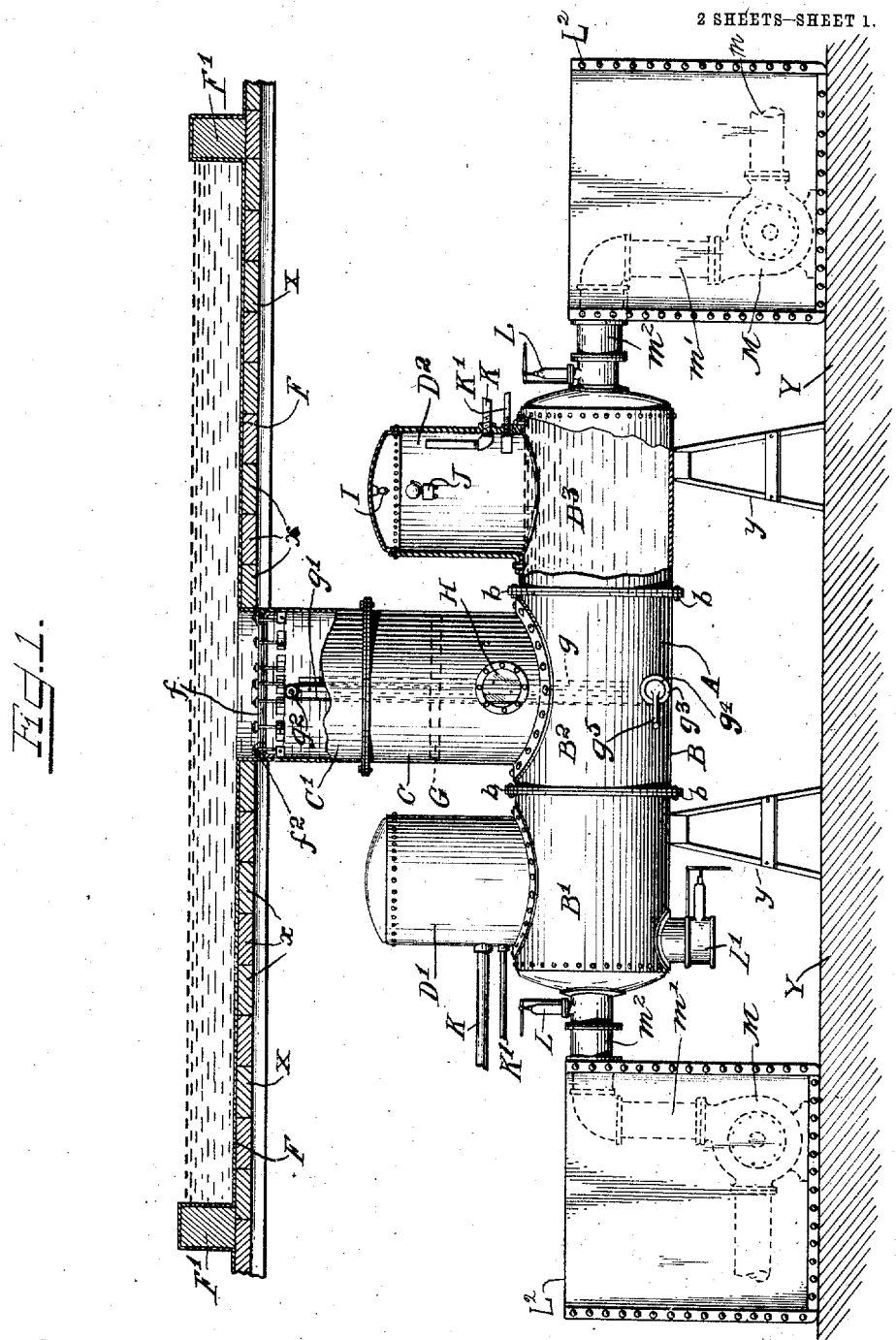

J. THOMPSON.
THEATRICAL AQUATIC APPARATUS.
APPLICATION FILED OCT. 26, 1911.

1,041,374.

Patented Oct. 15, 1912.

2 SHEETS—SHEET 1.

Attest:
Raymond Richardson
L. F. Morrison

Inventor:
John Thompson
by Rogers, Kennedy & Campbell
Attys

J. THOMPSON.
THEATRICAL AQUATIC APPARATUS.
APPLICATION FILED OCT. 26, 1911.
1,041,374.
Patented Oct. 15, 1912.
2 SHEETS—SHEET 2.
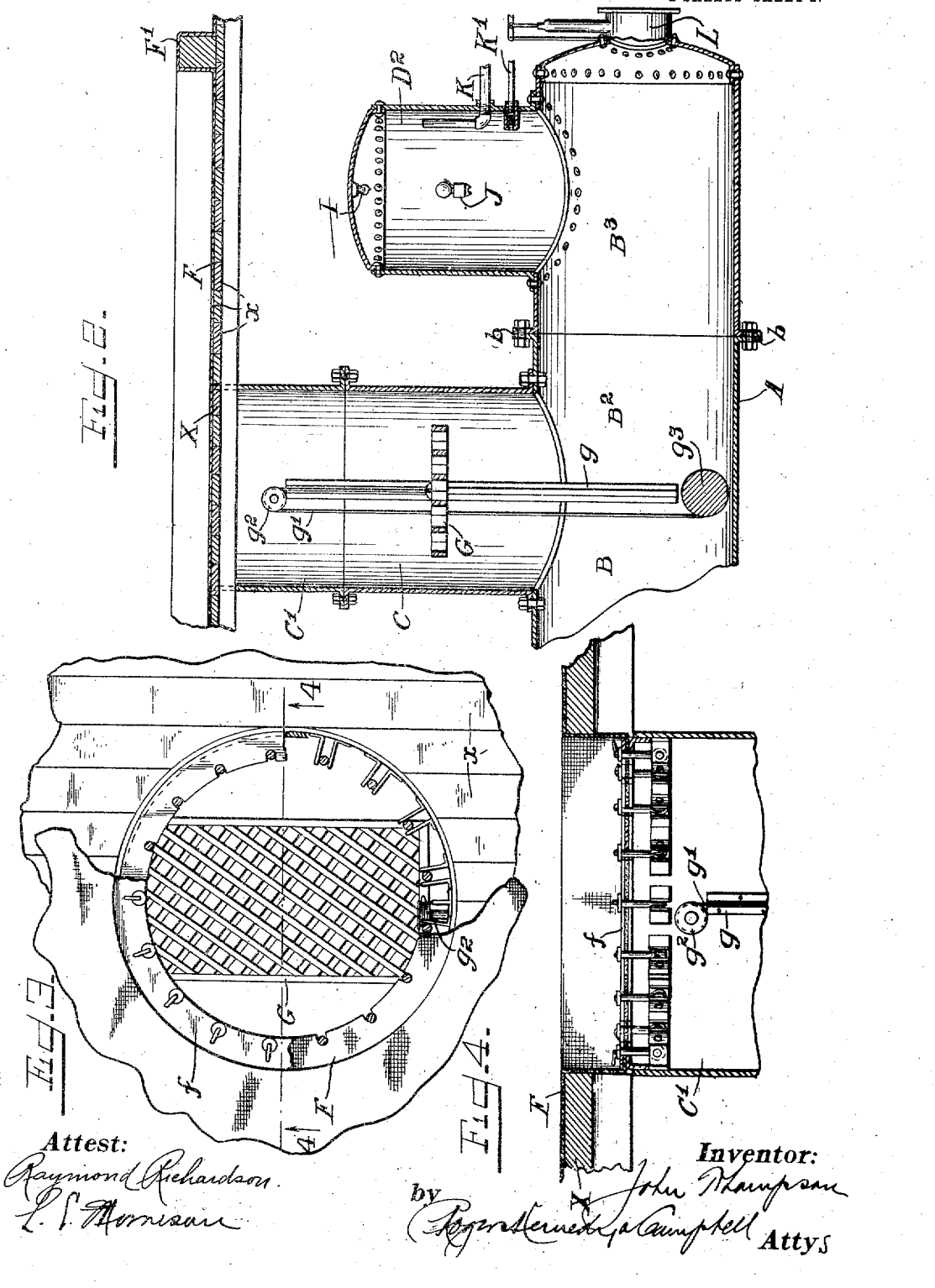
Attest:
Raymond Richardson.
L. S. Morrison.
Inventor:
John Thompson
by Rogers Kennedy & Campbell
Attys

UNITED STATES PATENT OFFICE.

JOHN THOMPSON, OF NEW YORK, N. Y.

THEATRICAL AQUATIC APPARATUS.

1,041,374.      Specification of Letters Patent.      Patented Oct. 15, 1912.

Application filed October 26, 1911. Serial No. 656,889.

*To all whom it may concern:*

Be it known that I, JOHN THOMPSON, a citizen of the United States, residing at New York, in the county of New York and State of New York, have invented certain new and useful Improvements in Theatrical Aquatic Apparatus, of which the following is a specification, reference being had therein to the accompanying drawing.

This invention relates to improvements in theatrical apparatus and more particularly to aquatic apparatus in which water is employed to give the effect of a pond or lake and into which water actors or divers may enter and remain for any given length of time in accordance with the plot or the arrangements of the play.

Heretofore it has been long known to employ a device known as a diving bell which is immersed and anchored in such a way that actors may enter the water and conceal themselves beneath the diving bell where a supply of air serves to sustain life until the time comes for reappearance at the surface of the water. In such cases an inverted bell or vessel entirely closed except at the bottom would be immersed and sunk beneath the surface of the water, the water sometimes being a tank especially prepared, or in the case of open air performances an open pond or lake. Owing to the buoyancy of the diving bell it had to be weighted and also anchored securely to the bottom by chains, posts, or other anchoring means. The device was hard to manage, it required a very large volume of water, in the case of indoor performances it was practically impossible to make the apparatus removable, and many other objections pertained to it which it is an object of the present invention to overcome.

Instead of employing an air containing means or vessel such as the diving bell secured within a tank or body of water, the present invention contemplates a complete and self-contained apparatus wherein an inclosed water vessel is employed having at one point on the upper side, means for the entrance of the actors, and having at other points air domes formed integrally or rigidly with the main vessel and standing sufficiently above it to contain the air necessary to sustain life and exclude the admission of water.

With my apparatus accidental drowning is absolutely prevented since no such mishap is able to occur as might occur in the use of the diving bell.

I will first describe one embodiment of my invention and will then point out the novel features in the claims.

In the accompanying drawings, Figure 1 represents a general vertical sectional view of my new and improved theatrical apparatus. Fig. 2 is a detail longitudinal section of the main vessel. Fig. 3 is a detail plan view of the stage floor, parts being broken away. Fig. 4 is a section on the line 4—4 of Fig. 3.

A substantially closed vessel A is included as one of the principal elements of the present invention. Said vessel is preferably constructed of sheet iron or steel plates securely bolted or riveted together to prevent bursting and avoid the possibility of accident in that respect. Said vessel also is preferably detachable into sections when it is of large size so as to render it easily portable in the manner hereinafter to be described more in detail. Said main vessel comprises several distinct but securely interconnected portions. Thus there is a horizontal portion or shell B. This shell for the purpose of facilitating transportation and setting up, may be constructed in any desired number of sections, for example the three attachable and detachable sections B', B², B³, all of which are interconnected into a single casing or shell by the flanges $b$ through bolts.

In addition to the shell portion B my invention contemplates an upstanding shaft or entrance portion C which extends upward in any suitable manner to the level of the stage floor X and constitutes an entrance by which the actors may enter into the vessel A. It will be understood that whatever is said herein regarding entrance of actors applies in the same way as regards their leaving the apparatus or returning to the surface.

My invention also contemplates as portions of the vessel A, one or more air domes which may be of any desired shape, length, width and height, but should in every case be such as to contain and retain air in sufficient body and quantity to sustain the life of the actor. Thus two air domes D', D² are shown, each of them consisting of sheet metal casings securely connected by rivets, bolts or the like to the upper side of the casing B.

In the above elements we have the substance of the invention. There are no immersed air-containing diving bells and the domes D', D² which constitute chambers for the concealed actors, are not in contact with water either on the inside or the outside. We have the vertical entrance shaft C and we have the horizontal shell portion B to which the several domes and the entrance portion are connected. If the device be filled with water through the entrance shaft or through inlets at the ends of the casing B, the water will rise until the casing B is filled and as more water is added it will continue to rise in the entrance shaft but will not rise any farther in the air domes excepting a fraction of an inch or so due to the compression of the contained air.

For employing the above described apparatus in a theater and for causing the representation of a body of water or lake in connection therewith, the following procedure may be adopted. Beneath the stage floor X are the usual timbers $x$, $x$. Above the cellar floor Y will be placed temporary supports $y$, $y$ of sufficient height and strength to support the apparatus in the manner shown. Since the timbers of stage floors differ, I have provided that my apparatus may be adapted thereto by an extension C' securely bolted or secured at the upper end of the center shaft C, thus relatively raising the height of the shaft, or on the other hand lowering the height of the air domes D', D². When the central shaft is circular in cross-section, an aperture of that shape will be cut into the stage floor and the upper end of the shaft fitted into said aperture, the same being adapted to be closed by a trap door or the like when the aquatic performance is not in progress.

To form an extended body of water very much greater than the small circular area of the central shaft, I prefer to employ a removable canvas sheet F treated with rubber or the like to make it impervious to water. This sheet may be sufficiently large to entirely cover the stage or may be smaller if desired. It will have a circular aperture at the proper point, and to this aperture will be cemented and otherwise properly secured, a clamping ring $f$ whereby the canvas may be clamped in a water-tight manner to the upper end of the vertical shaft. A convenient means of clamping the canvas in place is as follows. It will be seen that the clamping ring has a series of notches around its inner periphery. It will also be seen that the upper end of the central shaft has a series of swinging bolts around its inner periphery. When the ring is laid in place with the canvas between the ring and the upper end of the shaft, said bolts may be swung so as to engage in the notches of the ring, whereupon the clamping devices $f^2$ are closed entirely around the periphery and the water-tight connection is complete. Around the outer edge of the canvas or at any convenient point, a bank is formed by a series of timbers or bank pieces F'.

With such an apparatus when it is first installed it will be set up as shown in the drawings, and will be filled with water substantially to the stage level. When the aquatic act is to take place the canvas is brought into position, the bank pieces set where desired, and then a comparatively small amount of water needs to be flowed upon the canvas to fill the same to a depth, say six inches throughout the area of the supposed lake. As a matter of fact the supposed lake will have a depth of only six inches at every point excepting where the vertical shaft is located, and it will be at this point that the actors descend and ascend in carrying out the plot.

As a matter of convenience, I have shown a platform or elevator G located within the central shaft and fitted to slide on either side in engagement with vertical guide-ways $g$, $g$. For elevating and lowering the platform G it may have ropes $g'$ connected to it, passing around pulleys $g^2$ above and thence down to a drum $g^3$ at the bottom, which drum is properly supported in bearings, one of its pins or axles $g^4$ passing through a stuffing-box to the exterior of the apparatus, where it may be provided with a crank $g^5$, by which an attendant may effect the raising and lowering of the actor or actors. This operation, however, may be performed by motor if desired. A dead light H may be provided at a convenient point so that the attendant in the cellar may see into the interior as a guidance to him in performing his work and to preclude the possibility of a premature elevation of the platform.

I prefer that within each air dome shall be provided an electric light I and an electric bell J, and a telephone might also be included if desired.

Although it is not necessary, yet in case the actors are to remain below for a great length of time, it is preferable to supply fresh air to the domes, and for this purpose I have indicated for each of the domes an air inlet pipe K and outlet K'. Air may be forced in through pipe K by any well known air-pumping means, and the air will pass out by the outlet K', preferably through the operation of an automatic valve which is set like a pop valve to operate when the pressure exceeds a predetermined amount.

The horizontal shell B may have at each end a gate valve L capable of being quickly opened for draining the apparatus, either as a precaution against accidents or when it is desired to renew the water or to empty the apparatus; the renewal of the water after emptying to be effected through the communication L in any convenient manner, as for example by a pump for forcing water from reserve or supply tanks L² into the main vessel or shell B up to a level below the stage, before the employment of the aquatic apparatus, or to the desired full depth above the stage preparatory to such performance. An outlet L' may also be provided at the bottom of the shell for completely draining it when desired. The pumps for forcing the water from tanks L² into the main vessel may be centrifugal pumps M driven by motor or otherwise, and each acting to draw water from its tank through outlet m forcing the water upwardly through connection m', m² and through gate-valve L into the main vessel. The gate-valve will be closed to prevent back flow of the water. When it is desired to empty the main vessel the gate-valve is opened and the water simply flows back through the pumps M into the tanks L².

There is no external pressure on the air locks or domes hereof and they cannot collapse. There are no anchor chains or posts in the way of the actors.

I have above described one embodiment of my invention and set forth some of its advantages, and have shown how said apparatus overcomes the objections to prior apparatuses and affords the advantages referred to; and other advantages will be apparent to those skilled in the art.

While I have shown my invention applied to one form of apparatus it is obvious that it may be embodied in an indefinite number of physical forms or embodiments so that I do not desire to limit myself to any of the details shown nor to any specific features except as set forth in the appended claims.

What I claim and desire to secure by Letters Patent is:

1. In a theatrical apparatus, a water containing vessel, having an entrance shaft adapted to extend up to the stage level, and one or more air domes connected to said vessel.

2. In a theatrical apparatus, a water containing vessel, having an entrance shaft adapted to extend up to the stage level, and one or more air domes, said domes rigidly connected to the vessel casing and extending up to less than the stage level.

3. In a theatrical apparatus, a water containing vessel, having an entrance shaft adapted to extend up to the stage level, and one or more air domes, said domes rigidly connected to the vessel casing and extending up to less than the stage level, and means for maintaining air supply in said domes.

4. In a theatrical apparatus, a water containing vessel, having an entrance shaft adapted to extend up to the stage level, and one or more air domes, and means in said shaft adapted to assist the ascent and descent of actors.

5. In a theatrical apparatus, a water containing vessel, having an entrance shaft adapted to extend up to the stage level, and one or more air domes connected to said vessel, and means in said shaft adapted to permit the ascent and descent of actors, consisting of an elevator with means for operating it.

6. In a theatrical apparatus, a water containing vessel, having an entrance shaft adapted to extend up to the stage level, and one or more air domes connected to said vessel, each dome having illuminating means.

7. In a theatrical apparatus, a water containing vessel, having an entrance shaft adapted to extend up to the stage level, and one or more air domes connected to said vessel, each dome having illuminating means and signaling means.

8. In a theatrical apparatus, a water containing vessel, having an entrance shaft adapted to extend up to the stage level, and one or more air domes, said vessel comprising a horizontal shell from which each shaft and dome extend upward.

9. In a theatrical apparatus, a water containing vessel, having an entrance shaft adapted to extend up to the stage level, and one or more air domes, said vessel comprising a horizontal shell from which each shaft and dome extend upward, the shaft being attachable to both stage and said vessel and detachable therefrom.

10. In a theatrical apparatus, a water containing vessel, having an entrance shaft adapted to extend up to the stage level, and one or more air domes, said vessel comprising a horizontal shell from which each shaft and dome extend upward, said horizontal shell being made in detachable sections.

11. In a theatrical apparatus, a water containing vessel, having an entrance shaft adapted to extend up to the stage level, and one or more air domes connected to said vessel, a supply tank and means to force water from said tank into said vessel and up to above the stage level.

12. In a theatrical apparatus, a vessel having an upward shaft smaller than the vessel, and closed except at said shaft, the vessel conformed to provide an air lock or dome at its upper side at a point near to said shaft.

13. In a theatrical apparatus, a vessel having an upward shaft smaller than the vessel, and closed except at said shaft, the vessel conformed to provide an air lock or dome at its upper side at a point near to said shaft, with a dividing wall between shaft and lock whereunder an actor may pass from or to the air space in said lock.

14. In a theatrical aquatic apparatus for stage use, a non-submerged breathing chamber, means for maintaining a water surface above the stage, and an unobstructed water shaft extending downwardly from the stage to said chamber.

15. In a theatrical aquatic apparatus for stage use, a non-submerged breathing chamber containing air under pressure, means for maintaining a water surface above the stage, and an unobstructed water shaft extending downwardly from the stage to said chamber.

16. In a theatrical aquatic apparatus for stage use, a non-submerged breathing chamber containing air under pressure, means for maintaining a water surface above the stage, and a comparatively small downward water-filled shaft giving passage from the water surface above stage to said chamber.

17. In a theatrical aquatic apparatus for stage use, a non-submerged breathing chamber containing air under pressure, means for maintaining a water surface above the stage, and a water filled passage from said chamber to said above-stage means.

18. In a theatrical aquatic apparatus for stage use, a non-submerged breathing chamber containing air under pressure, means for maintaining a water surface above the stage, and a water filled passage from said chamber to said above-stage means, said passage being open to permit the free passage either way of performers.

19. In a theatrical aquatic apparatus for stage use of the kind having an extended water surface above the stage, the combination of a downward shaft smaller in area than said surface, a water containing vessel connected with the foot of said shaft and one or more air domes extending upwardly from said vessel.

20. In a theatrical aquatic apparatus for water surface above the stage, a downward shaft smaller in area than said surface, and breathing space into which several performers may enter by said shaft at the same time.

In testimony whereof I affix my signature in presence of two witnesses, October 16th, 1911.

JOHN THOMPSON.

Witnesses:
LILLIE THOMPSON,
DONALD CAMPBELL.

It is hereby certified that in Letters Patent No. 1,041,374, granted October 15, 1912, upon the application of John Thompson, of New York, N. Y., for an improvement in "Theatrical Aquatic Apparatus," an error appears in the printed specification requiring correction as follows: Page 4, line 41, after the word "for" insert the words *stage use having means for maintaining a;* and that the said Letters Patent should be read with this correction therein that the same may conform to the record of the case in the Patent Office.

Signed and sealed this 19th day of November, A. D., 1912.

[SEAL.]

C. C. BILLINGS,
*Acting Commissioner of Patents.*